United States Patent [19]
Cox

[11] 4,435,100
[45] Mar. 6, 1984

[54] FAIL-SAFE ZERO-LOAD HINGE/PIVOT

[75] Inventor: Ronald L. Cox, Long Beach, Calif.

[73] Assignee: McDonnell Douglas Corporation, Long Beach, Calif.

[21] Appl. No.: 333,114

[22] Filed: Dec. 21, 1981

[51] Int. Cl.³ .......................... B25G 3/00; F16D 1/00; F16G 11/00

[52] U.S. Cl. ...................................... 403/27; 411/366; 16/378; 384/276; 403/11; 403/151; 403/161; 403/408

[58] Field of Search ...................... 403/11, 21, 27, 151, 403/161, 388, 408, 119; 411/366, 367; 16/378, 379; 308/DIG. 4, 1 A; 384/276, 280, 281

[56] References Cited

U.S. PATENT DOCUMENTS

| | | | |
|---|---|---|---|
| 643,615 | 2/1900 | Nickerson | 403/408 UX |
| 663,464 | 12/1900 | Prince | 403/367 |
| 2,915,152 | 12/1959 | Graham | 403/408 X |
| 3,130,628 | 4/1964 | Blinn | 403/367 |
| 4,102,036 | 7/1978 | Salter | 403/367 X |

FOREIGN PATENT DOCUMENTS

| | | | |
|---|---|---|---|
| 32444 | 7/1981 | European Pat. Off. | 403/408 |
| 1118152 | 6/1968 | United Kingdom | 403/408 |

*Primary Examiner*—Wayne L. Shedd
*Attorney, Agent, or Firm*—John P. Scholl; George W. Finch; Donald L. Royer

[57] ABSTRACT

A fail-safe zero-load hinge or pivot-joint having a first load primary support path comprising a sleeve and nut combination and a secondary or redundant load support path comprising a shaft, sized to be inserted axially through the sleeve with diametrical clearance, for threaded engagement with a nut providing axial clearance from said primary members. The secondary shaft and nut combination holds the joint intact after the primary load members have failed permitting the joint assembly to perform its normal designed function of load carrying with the continued full range of movement without the risk of restricted operation seizure or jamming.

A locking cap is provided for simple, safe holding of the nuts of primary and secondary member from disengagement, or even partial back off.

A dye indicator may be used to indicate failure of the primary load carrying members.

7 Claims, 7 Drawing Figures

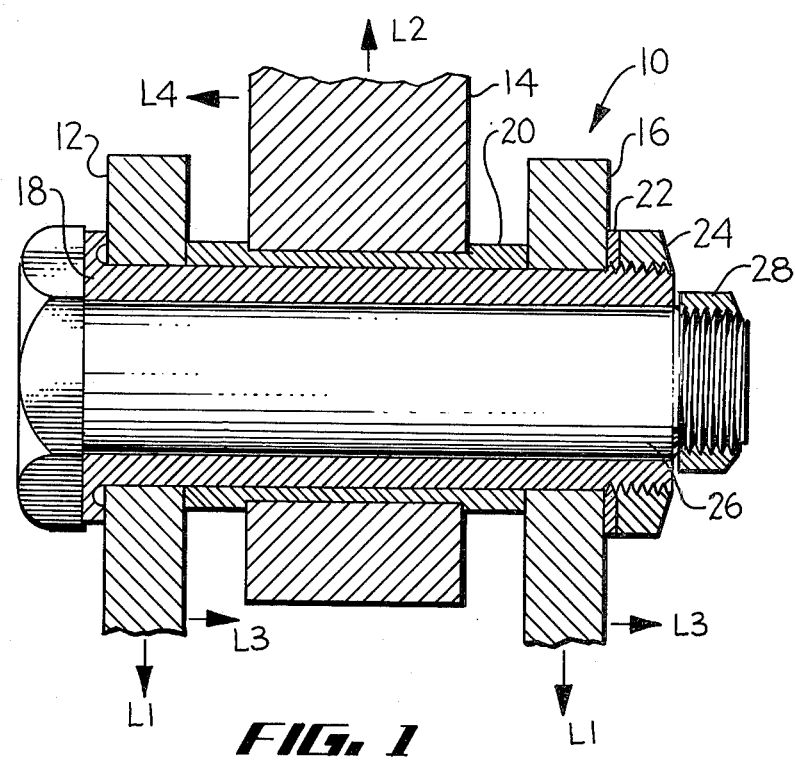
FIG. 1
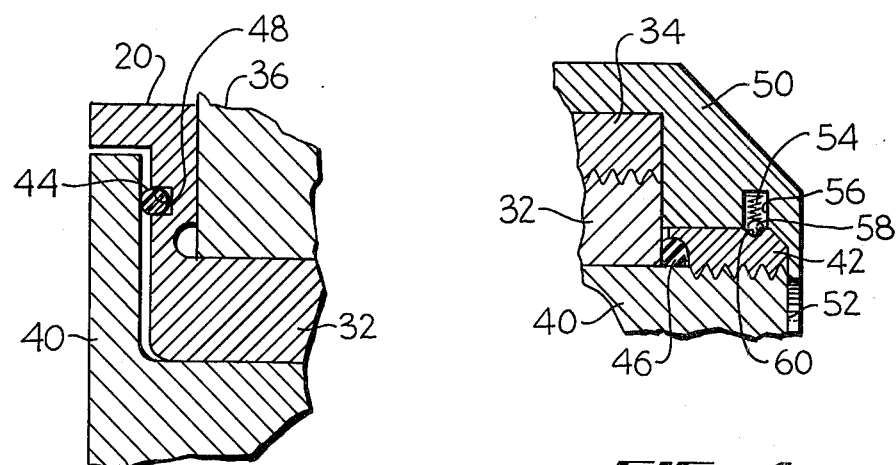
FIG. 3
FIG. 4

FAIL-SAFE ZERO-LOAD HINGE/PIVOT

BACKGROUND OF THE INVENTION

Primary aircraft control surfaces, for example ailerons, flaps, elevators or rudder, are mounted to fixed structures such as wings, vertical or horizontal stabilizers by a series of hinges or joints. It is essential that the links (lugs) in each pivot joint maintain their ability to freely rotate about the joints axis without jamming or freezing (seizing) in order that the control surface which it supports can function as required. The links in each joint may be required to react to axial or radial loads imposed by the control surface aerodynamic loadings. Loadings due to aircraft maneuvers (aerodynamic plus inertial) translate axial thrust forces along the hinge line of the control surface which have to be reacted by the pivots as a side or axial load.

Prior art pivot joints have been constructed with primary as well as secondary or backup load paths. During normal operation, however, some of the load is placed upon the alternate or secondary load path even though the primary load members are intact and performing their normal functions.

The prestressing of the members providing secondary or redundant load path while the primary members are in operation is undesirable. The reason for this undesirability is that no guarantee can be made that if the primary member fails that the secondary member will be intact to hold the joint together. Prestressing of the secondary member while the primary members are intact may cause the secondary member to fail first, this could lead to total loss of the joint when the primary member fails.

SUMMARY OF THE INVENTION

The object of the present fail-safe zero-load hinge is to provide a system wherein under normal conditions the primary members carry the entire load and the secondary or redundant members are consequently free from load or stress until failure of the primary members. Further, when the primary members fail the secondary members not only take up the loads imposed upon the hinge but hold the primary members in position so they do not interfere with the operation of the hinge.

To achieve the objects of the invention, the primary load members are comprised of a sleeve and a nut combination and the redundant, or secondary load members, are a bolt diametrically sized to be radially free floating within the sleeve in combination with a nut, which provides axial clearance for the secondary members, leaving the entire secondary system in a no-load state when the hinge is in a normal condition and the load has been placed on the primary members. Upon failure of the primary sleeve and nut combination the bolt and nut combination take up the load placed upon the hinge as well as retain the primary members in place thereby permitting full operation of the joint without the posibility of jamming or seizing due to interference by the disabled primary members. The secondary members may be comprised of any shaft and nut combination including a sleeve and nut combination for weight savings or for other reasons. This principal of a fail-safe zero-load hinge may be used to provide a tertiary redundant system. In this configuration, the primary members are a sleeve and nut combination, the secondary members are likewise a sleeve and nut combination which are free floating within the primary members (with diametrical and axial clearance). The tertiary members may either be a sleeve and nut or bolt and nut combination which are sized to free float within the secondary members. In each instance, with a failure of the primary system the backup system takes up the load and holds the primary members in position so there is no binding, seizing or disintegration of the hinge.

A locking cap may be provided to assure that the nuts on the primary, secondary or tertiary members do not loosen and disassemble the hinge. Further, a dye indicator may be incorporated into the hinge to show failure of the members.

DESCRIPTION OF THE DRAWINGS

FIG. 1 is a section through inventive hinge assembly in which the links are in a clamped up mode;

FIG. 3 is a detailed enlarged view of an o-ring seal installation found in FIG. 2;

FIG. 4 is an enlarged detail of a second o-ring seal assembly found in FIG. 2;

DESCRIPTION OF THE PREFERRED EMBODIMENT

Figure 2:
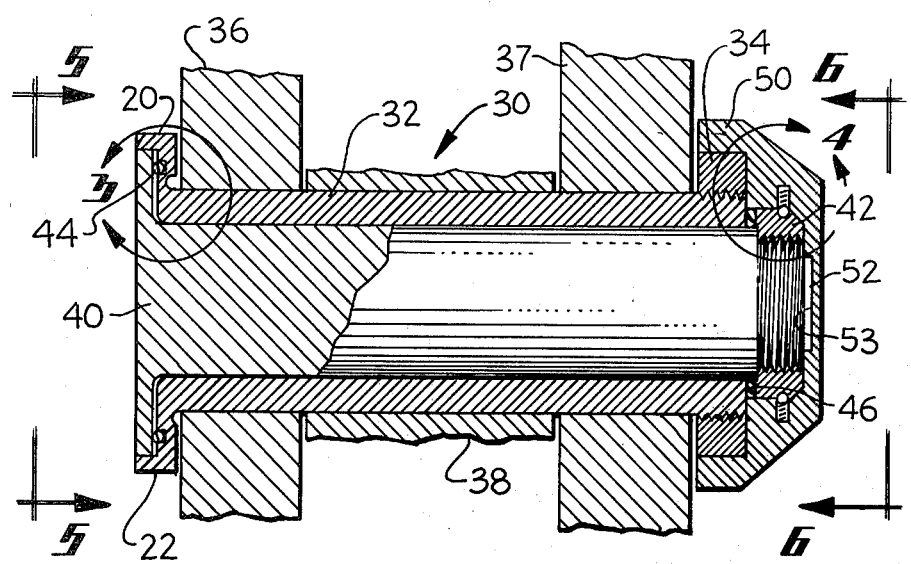
FIG. 2 is a section view through the inventive hinge assembly in which the links are in an unclamped free floating mode.

In multi-hinged assemblies it is sometimes efficient to allow one hinge to react to all of the side load and the remaining hinges to be floating, i.e., their components have sufficient axial freedom so that they do not react to axial loads. This feature is very important with respect to overall side load generation. When a major structure, e.g., a wing or stabilizer, experiences deformation due to aerodynamic loads, etc. the hinge line axis of the control surface mounted to it also experiences a proportional deformation, but the free deformation of the control surface is at a different rate from that of the wing therefore the deflected range in the length of the wing axis is different than that of the control surface. This relative change in length of the hinge line axis, although very small, may create exceedingly high side loads on hinge points. Some hinge and linkage members are not designed to take into consideration these deforming forces.

The inventive hinge joint may be designed to react to both axial and radial loads, react to only radial loads or react to radial loads and in part to axial loads.

FIG. 1 is a sectional view through the inventive hinge in which the linkage members are in a clamped up mode whereby the members react to both radial and axial loads. The inventive hinge 10 holds links (lugs) 12, 14 and 16 in juxtaposition. The primary load sleeve 18 passes through links 12 and 16 as well as a positional sleeve or bearing 20. The purpose of positional sleeve 20 is to hold link 14 in spaced relationship to links 12 and 16 when axial loads are applied to these links. The links are captured on sleeve 18 and held in fixed relationship by a washer 22 and a nut 24.

The secondary load support members for the hinge shown in FIG. 1 are bolt 26, which is of slightly smaller diameter than the inner bore of sleeve 18 thru which it passes, providing radial clearance between the two parts. The secondary load support is completed by nut 28 which is threaded on bolt 26. The axial travel of nut 28 on bolt 26 is limited by a shoulder on bolt 26 so that when nut 28 is fully tightened on bolt 26, nut 28 does not clamp up on sleeve 18 or nut 24. Due to the diametrical clearance and the axial clearance between the primary and secondary load support members the secondary bolt and nut combination are completely free floating in sleeve 18. Any shaft may be used for bolt 26, and it may be a sleeve if this is desirable for weight or other reasons. Nuts 24 and 28 may be of a self-locking type or be used with cotter keys, tabs or lock washers.

Viewing the hinge of FIG. 1 radial loads of L 1 applied to links 12 and 16 are reacted by an equal and opposite radial load L 2 applied to link 14. As discussed above, the clamped up condition of links 12 and 16 and the use of positional sleeve 20 holding tank 14 in space relationship to links 12 and 16 permits an axial load L 3 applied to links 12 and 16 to be reacted by an equal and opposite load L 4 applied to link 14.

FIG. 2 depicts an alternative embodiment of the inventive hinge 30 in which the joined links are in a free-floating mode or condition. In other words, the links are designed to react to radial loads but not to axial loads. The primary load support is provided by sleeve 32 and nut 34. Sleeve 32 passes through links 36, 37 and 38 and nut 34 holds the hinge assembly together. As indicated, there is axial clearance between sleeve/nut combination 32, 34 and link 37 as well as axial clearance between links 36, 37 and 38. When nut 34 is in the fully clamped up position on primary sleeve 32, the shoulder on sleeve 32 limits the axial travel of nut 34 and its positioning with respect to link 37.

Secondary load support for the hinge of FIG. 2 is provided by bolt 40 and nut 42. Bolt 40 is diametrically sized to be free-floating within the bore of sleeve 32. The threaded engagement of nut 42 on bolt 40 is again limited by a shoulder on bolt 40 and provides for axial clearance between nut 42 and the primary members sleeve 32 and nut 34. The secondary load support members of FIG. 2 are free-floating in that there is radial and axial clearance between the first and secondary load supports when the primary load support is functional. As discussed with reference to FIG. 1 above, any axial shaft could be used to provide the secondary load path and bolt 40 could be a sleeve for weight or other reasons.

The hinge 30 of FIG. 2 incorporates a dye indicator located in a reservoir for detection of failure of the primary load support. A suitable penetrating dye is placed in the cylindrical cavity between sleeve 32 and free-floating bolt 40. The dye is sealed in the cavity by o-rings 44 and 46.

FIGS. 3 and 4 are enlarged views of portions of FIG. 2 to show the detail of the structure surrounding o-rings 44 and 46. In FIG. 3 o-ring 44 is placed in channel 48 cut in the head portion of sleeve 32. O-ring 44 is compressed between the head of bolt 40 and the head of sleeve 32. In FIG. 4 o-ring 46 surrounds bolt 40 and is located between sleeve 32 and nut 42 thereby closing the end of the cylindrical dye. Locking cap 50 surrounds the entire sealing structure.

In the configuration of FIG. 2 the secondary load support members bolt 40 and nut 42 are not completely free-floating as respects the primary members sleeve 32 and nut 34 because of the interference fit of the o-rings. This interference fit resulting from the o-rings 44 and 46 transmits approximately 1–3% of the stress on the primary members to the secondary members when the hinge is in normal operation.

The primary purpose of locking cap 50 is to enhance the fail-safe design of the inventive hinge 30 by providing simple effective means for preventing the loosening or disengagement of nuts 34 and 42 from their associated members.

When locking cap 50 is employed with the inventive hinge 30 the threads on the primary load members, i.e., sleeve 32 and nut 34, and those on the secondary members bolt 40 and nut 42 are reversed. For example, the threads on sleeve 32 may be right-handed threads as well as will the threads on the mating nut 34. Threads on bolt 40 and on mating nut 42 will be left-handed. In addition, bolt 40 has a tab 52 on its end (FIG. 2). Locking cap 50 fits over the nut assemblies and holds nuts 34 and 42 in a fixed relationship preventing relative rotational movement of the nuts. Tab 52 fits into a groove 53 in cap 50 and prevents cap 50 rotating with respect to bolt 40.

Figure 6:
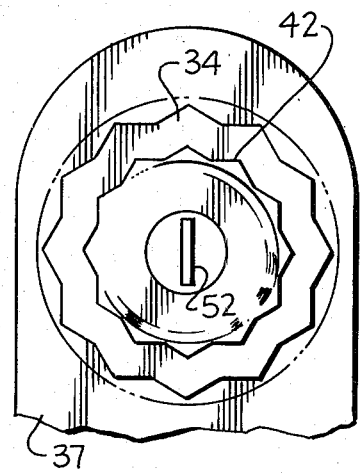
FIG. 6 is a side view of the hinge of FIG. 2 along the line 6—6 with the end cap removed.

FIG. 6 discloses twelve point nuts 34 and 42. These nuts mate with twelve-point cutouts in locking cap 50. The number of points or flats on the nuts is not critical so long as they mate with suitable cutouts in cap 50 and are capable of preventing back off, e.g., unwinding of the lock nuts 34 and 42.

Locking cap 50 is held in position on nut 42 by ball plungers and groove arrangement, FIG. 4. A coil spring 54 is mounted in a hole 56 in cap 50. The spring 54 biases a small ball inwardly (downward in FIG. 4) into mating groove 60 in nut 42. Hole 56 is sized so that it will hold ball 58 against the bias of coil spring 54. Ball 58 and mating groove 60 interact to provide resistance to removal of cap 50 from its position in FIG. 2. Cap 50 may have more than one spring loaded ball engaging groove 60, as for example, two as shown in FIG. 2.

Figure 5:
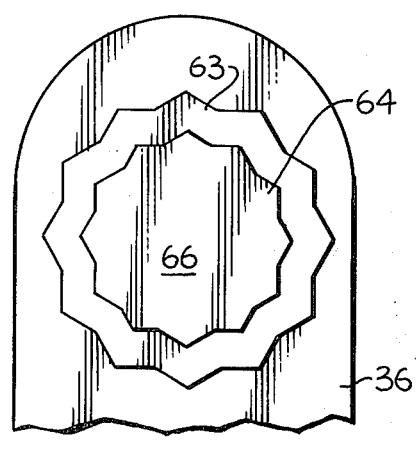
FIG. 5 is a side view of the hinge of FIG. 2 along the line 5—5.

On the end of the hinge 30 opposite the nuts 34 and 42 there is provided a sliding fit between sleeve 32 and bolt 40 (FIG. 2). Sleeve 32 has a head 63 which has been provided with a twelve-point cutout 64 (FIG. 5). This cutout 64 will accept the twelve-point head 66 of bolt 44. As shown in FIG. 3, there is radial and axial clearance between the bolt head 66 and the sleeve head 63. The design using twelve-point bolt heads and twelve-point cutouts is for convenience only. In standard aircraft practice other suitably configured nuts and bolts may be used.

Figure 7:
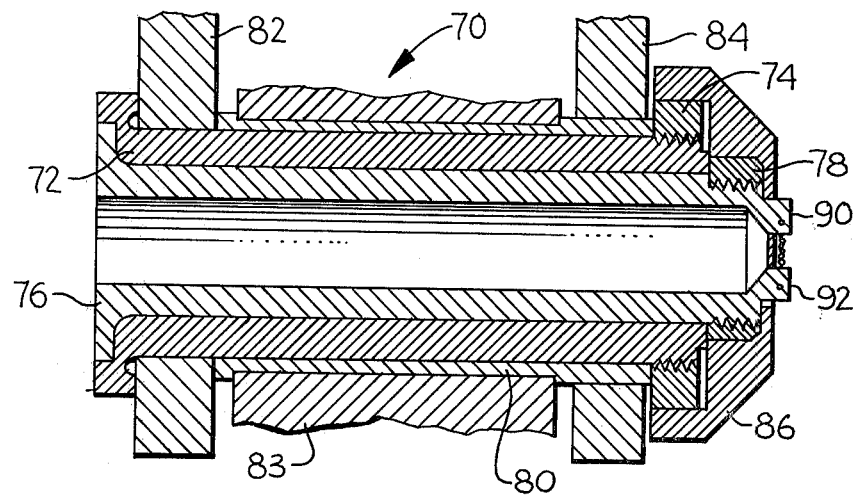
FIG. 7 is a section view through the inventive hinge assembly in which the links are in a propped cantilever or semifloating mode.

When end cap 50 is placed over nuts 34 and 42 on the hinge 30, the nuts are prevented from loosening. If nut 34 turns to loosen it will tighten nut 42 since the threads of the primary and secondary members are reversed. In addition, if the primary sleeve member 32 fails, tab 52 on the end of bolt 40 engaged in groove (cutout) 53 on cap 50 and thus nut 42 is prevented from loosening on bolt 40. Locking cap 50 may be held in place by diverse means, including those shown in FIGS. 2, 4, and 7.

Where it is desirable to have only a portion of the links encompassed by a hinge joint react to axial loads an alternative configuration of the inventive hinge may be used. FIG. 7 depicts an assembly of links which are in propped cantilever or semifloating mode. Again, the primary load carrying structure is sleeve 72 and nut 74. The secondary load bearing structure is sleeve 76 and nut 78. Spacer sleeve 80 holds link 82 in spaced relationship to link 83. Link 84 is provided with axial clearance and is axially free-floating with respect to hinge 70. In the configuration of FIG. 7 link 82 and 83 will react to radial as well as axial loads. Link 84 will only react to radial loads.

In the configuration of FIG. 7 a tertiary redundant load path could be provided by inserting a bolt thru sleeve 76 and complete the assembly with a lock nut. Radial and axial clearance should be maintained between the members if comprising the triple system.

The configuration of the head on sleeve 72 and the head of sleeve 76 are similar to those shown in FIGS. 2 and 6.

End cap 86 performs the same function as locking cap 50 in FIG. 2. However, instead of being held on with a ball and groove arrangement a two-part tab 88 has been inserted through two holes cut in end cap 86 and the two ears 90 and 92 have been extended beyond the end cap 86 and have been safety wired together to secure cap 86 covering and holding nuts 74 and 78 in fixed relationship. The threads on the primary members 72 and 74 are reversed from the threads on the secondary members 76 and 78 so that loosening of nut 74 will tighten nut 78. Upon failure of the primary members 72 and 74, locking cap 86 is held in fixed relationship to sleeve 76 by two tab ears 90 and 92, and cap 86 prevents nut 78 from loosening on sleeve 76.

The end cap system as well as the dye indicator may be used together or independently on any of the three hinge configurations shown in FIGS. 1, 2 or 7.

While certain exemplary embodiments of this invention have been described above and shown in the accompanying drawings, it is to be understood that such embodiments are merely illustrative of, and not restrictive on, the broad invention to the specific desire to be limited in my invention to the specific construction or arrangements shown and described, since various other obvious modifications may occur to persons having ordinary skill in the art.

What is claimed is:

1. A fail-safe hinge for joining linkage members comprising:

a primary sleeve inserted through the linkage members having a flange on one end and threads on the opposite end and an axial bore;

a primary nut threaded on the sleeve that captures and holds the linkage members in juxtaposition;

a secondary support member axially inserted inside the primary sleeve, and having a diameter with a predetermined clearance therein and having a head on one end and threads on its opposite end; and a secondary nut in threaded engagement with said secondary support member, limited travel of said nut limited on said support member to provide axial clearance between said secondary support member and nut and the combined primary sleeve and nut said secondary support member and secondary nut being of such a size that upon failure of the primary sleeve and nut combination said secondary support member and nut maintain the linkage members in juxtaposition and hold the primary sleeve and nut combination in their relative position.

2. The fail-safe hinge of claim 1 wherein the secondary support member is a solid shaft.

3. The fail-safe hinge of claim 2 having a safety locking system said locking system comprising:

a tab located on said shaft;

a locking cap interconnected with and retained by said secondary nut, said cap also receiving said tab in a slot, said cap also interconnecting with said primary nut;

the threads on said primary sleeve and nut being reversed from the threads on said secondary shaft and said secondary nut; and interlock means between the head of said shaft and the flange of the sleeve wherein said interlock means prevents the flange from rotating with respect to said shaft.

4. The fail-safe hinge of claim 3 having an indicator dye system to detect rupture of said primary sleeve and nut combination said system comprising:

a first O-ring position surrounding said shaft near the threaded end of said shaft providing a fluid-tight seal between said shaft and the interior of said primary sleeve;

a second O-ring positioned near the opposite end of said shaft providing a fluid-tight seal between said flange on said primary sleeve and the head on said secondary shaft; and a dye indicator held in confinement between said shaft and said sleeve by said first and second O-rings.

5. The fail-safe hinge of claim 4 wherein said linkage members are held in an abating clamped up relationship by said primary sleeve and primary nut so that said linkage members react to both radial and axial loads placed across said hinge.

6. The fail-safe hinge of claim 4 wherein the primary sleeve and nut combination hold the linkage members loosely in an axial direction provding axial clearance between said linkage members but eliminating the transmission of axial load.

7. The fail-safe hinge of claim 4 wherein said linkage is partially reactive to an axial load between said linkage members said hinge having a spacer sleeve surrounding said primary sleeve that axially engages a linkage member to be reactive to axial loads and radially engage and hold in position a second linkage, with respect to said first linkage said primary nut holding said spacer sleeve in fixed position and said spacer sleeve also having radial clearance through a third linkage member which permits movement of said third linkage member with respect to said first and second linkage members.

* * * * *